(12) United States Patent
Nelson et al.

(10) Patent No.: US 9,702,455 B2
(45) Date of Patent: Jul. 11, 2017

(54) ELECTRONIC SHIFTING OF A TRANSMISSION

(71) Applicant: Polaris Industries Inc., Medina, MN (US)

(72) Inventors: Stephen L. Nelson, Osceola, WI (US); Donovan L. Fredrickson, Independence, MN (US); David J. Koenig, Wyoming, MN (US); Ryan D. Carlson, Blaine, MN (US); Aaron D. Deckard, Zionsville, IN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/554,648

(22) Filed: Nov. 26, 2014

(65) Prior Publication Data

US 2016/0146334 A1    May 26, 2016

(51) Int. Cl.
*G06F 7/00* (2006.01)
*G06F 17/00* (2006.01)
*G06F 19/00* (2011.01)
*F16H 61/02* (2006.01)
*B60L 15/20* (2006.01)
*F16H 61/16* (2006.01)
*F16H 61/70* (2006.01)
(Continued)

(52) U.S. Cl.
CPC ...... *F16H 61/0204* (2013.01); *B60L 15/2054* (2013.01); *F16H 59/105* (2013.01); *F16H 61/0248* (2013.01); *F16H 61/16* (2013.01); *F16H 61/662* (2013.01); *F16H 61/702* (2013.01); *F16H 2059/366* (2013.01); *Y02T 10/7258* (2013.01)

(58) Field of Classification Search
CPC .......... F16H 15/50; F16H 15/52; F16H 37/08; F16H 59/72; F16H 15/38; F16H 59/08; F16H 59/02; F16H 59/16; F16H 59/14; F16H 59/36; B60L 11/12; B60L 11/00; B60L 11/02
USPC .......... 701/51, 52, 58, 60, 61, 54, 24, 25, 22
See application file for complete search history.

(56) References Cited

U.S. PATENT DOCUMENTS 4,075,841 A    2/1978   Hamma et al.
5,040,114 A    8/1991   Ishikawa et al.
(Continued)

FOREIGN PATENT DOCUMENTS

DE    19941009 A1    3/2001
EP    2169278 A1     3/2010

OTHER PUBLICATIONS

International Search Report and Written Opinion issued by the European Patent Office, dated Mar. 18, 2016, for International Application No. PCT/US2015/061274; 9 pages.
(Continued)

*Primary Examiner* — Jelani Smith
*Assistant Examiner* — Luis A Martinez Borrero
(74) *Attorney, Agent, or Firm* — Faegre Baker Daniels LLP

(57) ABSTRACT

A recreational vehicle is provided including a power source, such as an engine or an electric motor, and a transmission having a variable gear ratio. A sub-transmission coupled to an output of the transmission includes a plurality of selectable gear configurations including at least one of a forward gear, a neutral gear, a reverse gear, and a park gear. An electronic controller is operative to electronically control the gear configuration of the sub-transmission.

34 Claims, 8 Drawing Sheets

(51) Int. Cl.
*F16H 59/10* (2006.01)
*F16H 61/662* (2006.01)
*F16H 59/36* (2006.01)

(56) References Cited

U.S. PATENT DOCUMENTS

| | | | |
|---|---|---|---|
| 5,218,540 A | 6/1993 | Ishikawa et al. | |
| 5,575,737 A | 11/1996 | Weiss | |
| 6,139,468 A | 10/2000 | Goates et al. | |
| 6,182,784 B1 | 2/2001 | Pestotnik | |
| 6,186,263 B1* | 2/2001 | Takano | F16H 59/10 180/336 |
| 6,456,918 B2 | 9/2002 | Nanri | |
| 6,485,340 B1 | 11/2002 | Kolb et al. | |
| 6,581,710 B2 | 6/2003 | Sprinkle et al. | |
| 6,655,233 B2 | 12/2003 | Evans et al. | |
| 6,675,577 B2 | 1/2004 | Evans | |
| 6,851,495 B2 | 2/2005 | Sprinkle et al. | |
| 6,857,499 B2* | 2/2005 | Kawamoto | B62K 5/01 180/336 |
| 7,044,260 B2 | 5/2006 | Schaedler et al. | |
| 7,150,341 B2* | 12/2006 | Maeda | B60K 37/06 180/336 |
| 7,156,218 B2 | 1/2007 | Yamamoto | |
| 7,213,674 B2* | 5/2007 | Maeda | B60K 37/06 180/336 |
| 7,281,375 B1* | 10/2007 | Holder | F16H 61/435 60/487 |
| 7,533,755 B2* | 5/2009 | Miyazaki | F16H 59/04 180/336 |
| 7,537,499 B2* | 5/2009 | Davis | B60G 3/06 114/360 |
| 7,544,149 B2 | 6/2009 | Ayabe et al. | |
| 7,637,343 B2 | 12/2009 | Nakagaki et al. | |
| 7,651,438 B2 | 1/2010 | Someya et al. | |
| 7,665,566 B2 | 2/2010 | Okada et al. | |
| 7,793,751 B2* | 9/2010 | Stevens | B62K 5/01 180/336 |
| 8,050,827 B2 | 11/2011 | Hasegawa et al. | |
| 8,061,465 B2* | 11/2011 | Martino | B62D 61/06 180/210 |
| 8,260,527 B2 | 9/2012 | Arai | |
| 8,281,892 B2* | 10/2012 | Sugimoto | B60K 17/105 180/307 |
| 8,296,034 B2 | 10/2012 | Tetsuka et al. | |
| 8,370,032 B2* | 2/2013 | Choby | F16H 59/66 303/161 |
| 8,381,846 B2 | 2/2013 | Davies | |
| 8,996,214 B2 | 3/2015 | Ishii | |
| 9,057,436 B1* | 6/2015 | Itoo | F16H 63/30 |
| 9,328,819 B2 | 5/2016 | Deurloo et al. | |
| 2001/0005705 A1 | 6/2001 | Kon et al. | |
| 2002/0033059 A1* | 3/2002 | Pels | B60K 6/26 74/329 |
| 2002/0072449 A1 | 6/2002 | Iwase et al. | |
| 2003/0119630 A1 | 6/2003 | Edelen et al. | |
| 2005/0279546 A1* | 12/2005 | Tabata | B60K 6/445 180/65.235 |
| 2005/0288151 A1 | 12/2005 | Yamamoto | |
| 2006/0015234 A1* | 1/2006 | Luh | B60W 30/182 701/51 |
| 2006/0019790 A1 | 1/2006 | Morin et al. | |
| 2006/0081085 A1 | 4/2006 | Otsuka et al. | |
| 2006/0208169 A1* | 9/2006 | Breed | B60N 2/002 250/221 |
| 2006/0270520 A1 | 11/2006 | Owens et al. | |
| 2007/0004552 A1* | 1/2007 | Matsudaira | B60W 30/182 477/37 |
| 2007/0066444 A1 | 3/2007 | Matsudaira et al. | |
| 2008/0086240 A1* | 4/2008 | Breed | G07C 5/008 701/1 |
| 2008/0183358 A1* | 7/2008 | Thomson | B60W 10/06 701/54 |
| 2008/0221760 A1 | 9/2008 | Wakamatsu et al. | |
| 2009/0012682 A1 | 1/2009 | Mathis | |
| 2009/0111649 A1 | 4/2009 | Hecht et al. | |
| 2009/0111654 A1 | 4/2009 | Hecht et al. | |
| 2009/0120710 A1 | 5/2009 | Hasegawa et al. | |
| 2009/0152070 A1* | 6/2009 | Nakamura | F16H 61/0059 192/219 |
| 2009/0239705 A1* | 9/2009 | Tawara | F16H 61/143 477/38 |
| 2009/0301830 A1* | 12/2009 | Kinsman | B60G 15/063 188/289 |
| 2009/0302590 A1* | 12/2009 | Van Bronkhorst | B60G 15/063 280/756 |
| 2010/0191429 A1* | 7/2010 | Kuwahara | F16H 61/66259 701/58 |
| 2011/0077810 A1* | 3/2011 | Katou | B60W 10/108 701/22 |
| 2011/0127095 A1* | 6/2011 | Imamura | B60K 6/445 180/65.285 |
| 2011/0297462 A1 | 12/2011 | Grajowski et al. | |
| 2012/0178561 A1* | 7/2012 | Lafreniere | F16H 55/56 474/28 |
| 2012/0193163 A1* | 8/2012 | Wimpfheimer | B60G 3/20 180/233 |
| 2012/0196713 A1* | 8/2012 | He | B60K 6/105 475/5 |
| 2012/0217078 A1* | 8/2012 | Kinsman | B60R 21/13 180/69.4 |
| 2013/0033070 A1* | 2/2013 | Kinsman | B62D 21/183 296/190.03 |
| 2013/0066496 A1* | 3/2013 | Ishii | B60K 6/485 701/22 |
| 2013/0092468 A1* | 4/2013 | Nelson | B60W 50/082 180/366 |
| 2013/0096790 A1 | 4/2013 | Nelson | |
| 2013/0096793 A1* | 4/2013 | Krosschell | F16H 63/50 701/68 |
| 2013/0175779 A1* | 7/2013 | Kvien | B60G 3/20 280/124.15 |
| 2013/0245875 A1* | 9/2013 | Imamura | B60K 6/44 701/22 |
| 2013/0319785 A1* | 12/2013 | Spindler | B62D 23/005 180/292 |
| 2014/0060954 A1 | 3/2014 | Smith et al. | |
| 2014/0136060 A1 | 5/2014 | Deurloo et al. | |
| 2014/0288763 A1 | 9/2014 | Bennett et al. | |
| 2014/0290408 A1 | 10/2014 | Kudo et al. | |
| 2014/0338484 A1 | 11/2014 | Maki et al. | |
| 2014/0343807 A1 | 11/2014 | Maki | |
| 2015/0041237 A1* | 2/2015 | Nadeau | B60K 5/00 180/292 |
| 2015/0057866 A1* | 2/2015 | Tseng | B60W 30/19 701/22 |
| 2015/0094919 A1 | 4/2015 | Nozaki et al. | |
| 2016/0091057 A1* | 3/2016 | Choi | B60K 6/442 74/665 B |
| 2016/0091077 A1* | 3/2016 | Sotani | F16H 57/021 74/606 R |
| 2016/0146334 A1 | 5/2016 | Nelson et al. | |
| 2016/0194854 A1* | 7/2016 | Yamazaki | E02F 9/2079 74/732.1 |
| 2016/0195186 A1* | 7/2016 | Shamshiri | B60W 50/12 701/58 |

OTHER PUBLICATIONS

Second Written Opinion of the International Searching Authority issued by the European Patent Office, mailed Nov. 9, 2016, for International Application No. PCT/US2015/061274; 5 pages.

* cited by examiner

ELECTRONIC SHIFTING OF A TRANSMISSION

FIELD OF THE DISCLOSURE

The present disclosure relates to an electronically controlled transmission, and more particularly to systems and methods for electronically controlling a sub-transmission of a recreational vehicle.

BACKGROUND AND SUMMARY

Some recreational vehicles, such as all-terrain vehicles (ATV's), utility vehicles, motorcycles, etc., include a continuously variable transmission (CVT). In these vehicles, an actuator adjusts the position of one of the primary and secondary clutches of the CVT to change the gear ratio. Other recreational vehicles include a hydrostatic transmission.

In recreational vehicles with a CVT or hydrostatic transmission, a separate sub-transmission is typically coupled to an output of the CVT or hydrostatic transmission for shifting between park, neutral, reverse, and forward gear configurations. Sub-transmissions, also referred to as a range box, are mechanically linked to a shifter located in the operator area. The mechanical linkage may include cables and other linkages. The mechanical components of the shift system occupy space in the vehicle and require maintenance over time due to wear and corrosion. Further, shifting the sub-transmission under improper vehicle conditions may result in damage to the powertrain of the vehicle.

In an illustrated embodiment of the present disclosure, a recreational vehicle is provided including a chassis, a ground engaging member configured to support the chassis, and a power source supported by the chassis. The power source includes at least one of an engine and an electric motor. The vehicle further includes a transmission including at least one of a continuously variable transmission and a hydrostatic transmission. The transmission is driven by the power source and has an adjustable gear ratio. The vehicle further includes a sub-transmission coupled to the transmission. The sub-transmission has a plurality of selectable gear configurations including a forward gear and at least one of a park gear, a neutral gear, and a reverse gear. The vehicle further includes an actuator operative to change a gear configuration of the sub-transmission. The vehicle further includes a shift device having a signal output operative to provide a shift request signal indicative of a request to change the gear configuration of the sub-transmission. The vehicle further includes a controller including at least one processor. The controller is operative to control the gear ratio of transmission and is in communication with the shift device and the actuator. The controller is operative to control the actuator to change the gear configuration of the sub-transmission in response to detecting the shift request signal provided by the shift device.

In another illustrated embodiment of the present disclosure, a method of controlling a sub-transmission of a recreational vehicle is provided. The method includes controlling, by a controller of the vehicle, an output speed of a power source of the vehicle. The controller includes at least one processor. The power source includes at least one of an engine and an electric motor. The method further includes controlling, by the controller, a gear ratio of a transmission of the vehicle. The transmission includes at least one of a continuously variable transmission and a hydrostatic transmission. The transmission is driven by the power source. The method further includes detecting, by the controller, a shift request signal provided by a shift device. The shift request signal indicates a request to shift a sub-transmission of the vehicle to a target gear configuration. The sub-transmission is coupled to and driven by an output of the transmission and has a plurality of selectable gear configurations including a forward gear and at least one of a park gear, a neutral gear, and a reverse gear. The method further includes controlling an actuator to change a gear configuration of the sub-transmission to the target gear configuration based on the shift request signal.

In yet another illustrated embodiment of the present disclosure, a non-transitory computer-readable medium is provided. The computer-readable medium includes executable instructions such that when executed by at least one processor cause the at least one processor to control an output speed of a power source of a vehicle. The power source includes at least one of an engine and an electric motor. The executable instructions when executed by the at least one processor further cause the at least one processor to control a gear ratio of a transmission of the vehicle. The transmission includes at least one of a continuously variable transmission and a hydrostatic transmission and is driven by the power source. The executable instructions when executed by the at least one processor further cause the at least one processor to detect a shift request signal provided by a shift device. The shift request signal indicates a request to shift a sub-transmission of the vehicle to a target gear configuration. The sub-transmission is driven by an output of the transmission and has a plurality of selectable gear configurations including a forward gear and at least one of a park gear, a reverse gear, and a neutral gear. The executable instructions when executed by the at least one processor further cause the at least one processor to control an actuator to change a gear configuration of the sub-transmission to the target gear configuration based on the shift request signal.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
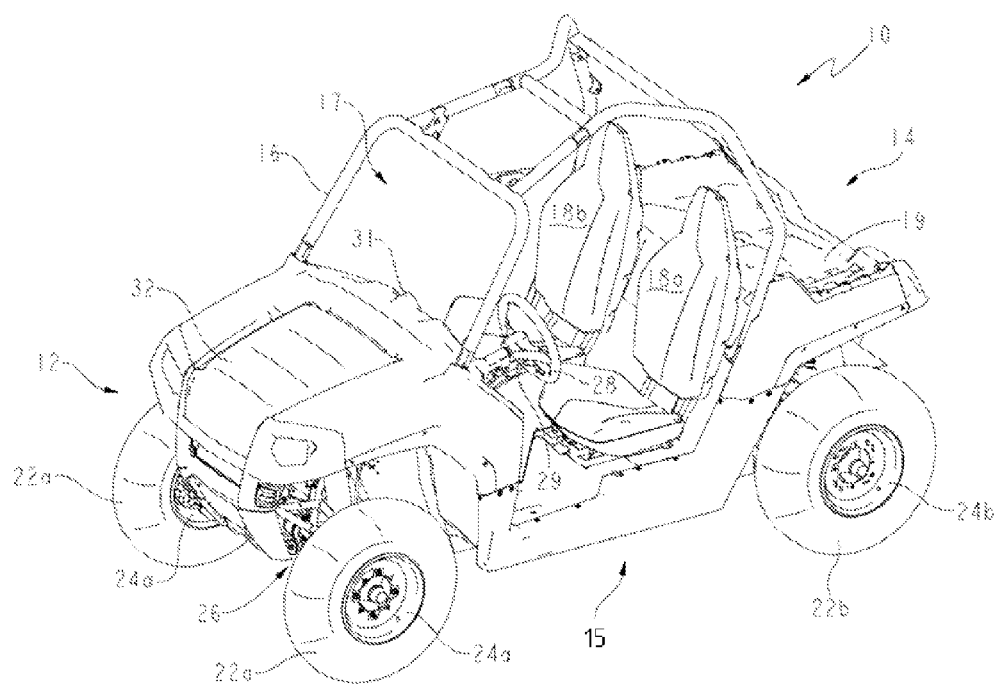
FIG. 1 is a perspective view of an exemplary vehicle incorporating the electronically controlled sub-transmission of the present disclosure.

Referring initially to FIG. 1, an exemplary vehicle 10 is illustrated that includes an electronically controlled sub-transmission as disclosed herein. Vehicle 10 is illustratively a side-by-side ATV 10 including a front end 12, a rear end 14, and a frame or chassis 15 that is supported above the ground surface by ground engaging members in the form of a pair of front wheels 24a including tires 22a and a pair of rear wheels 24b including tires 22b. Vehicle 10 includes a pair of laterally spaced-apart bucket seats 18a, 18b, although a bench style seat or any other style of seating structure may be used. Seats 18a, 18b are positioned within a cab 17 of vehicle 10. A protective roll cage 16 extends over cab 17 to reduce the likelihood of injury to passengers of vehicle 10 from passing branches or tree limbs and to serve as a support in the event of a vehicle rollover. Roll cage 16 includes a plurality of support bars and, in one embodiment, is comprised of a metal material. Cab 17 also includes front dashboard 31, adjustable steering wheel (steering device) 28, and shift lever 29. Front dashboard 31 may include a tachometer, speedometer, a display (e.g., display 106 of FIG. 2), or any other suitable instrument.

Front end 12 of vehicle 10 includes a hood 32 and a front suspension assembly 26. Front suspension assembly 26 pivotally couples front wheels 24a to vehicle 10. Rear end 14 of vehicle 10 includes an external storage platform 19 which serves as an engine cover extending over a power source, such as an engine 42 (see FIG. 2). Storage platform 19 is configured to secure or store one or more objects during operation of vehicle 10. Rear end 14 further includes a rear suspension assembly (not shown) pivotally coupling rear wheels 24b to vehicle 10. In one embodiment, a body of vehicle 10 is made of a plastic, including for example hood 32, storage platform 19, and/or side panels of vehicle 10. Other suitable vehicles may be provided that incorporate the drive system and control strategies described herein, such as a snowmobile, a straddle-seat ATV (e.g., see vehicle 310 of FIG. 8), a utility vehicle, a motorcycle, and other recreational and non-recreational vehicles.

Figure 2:
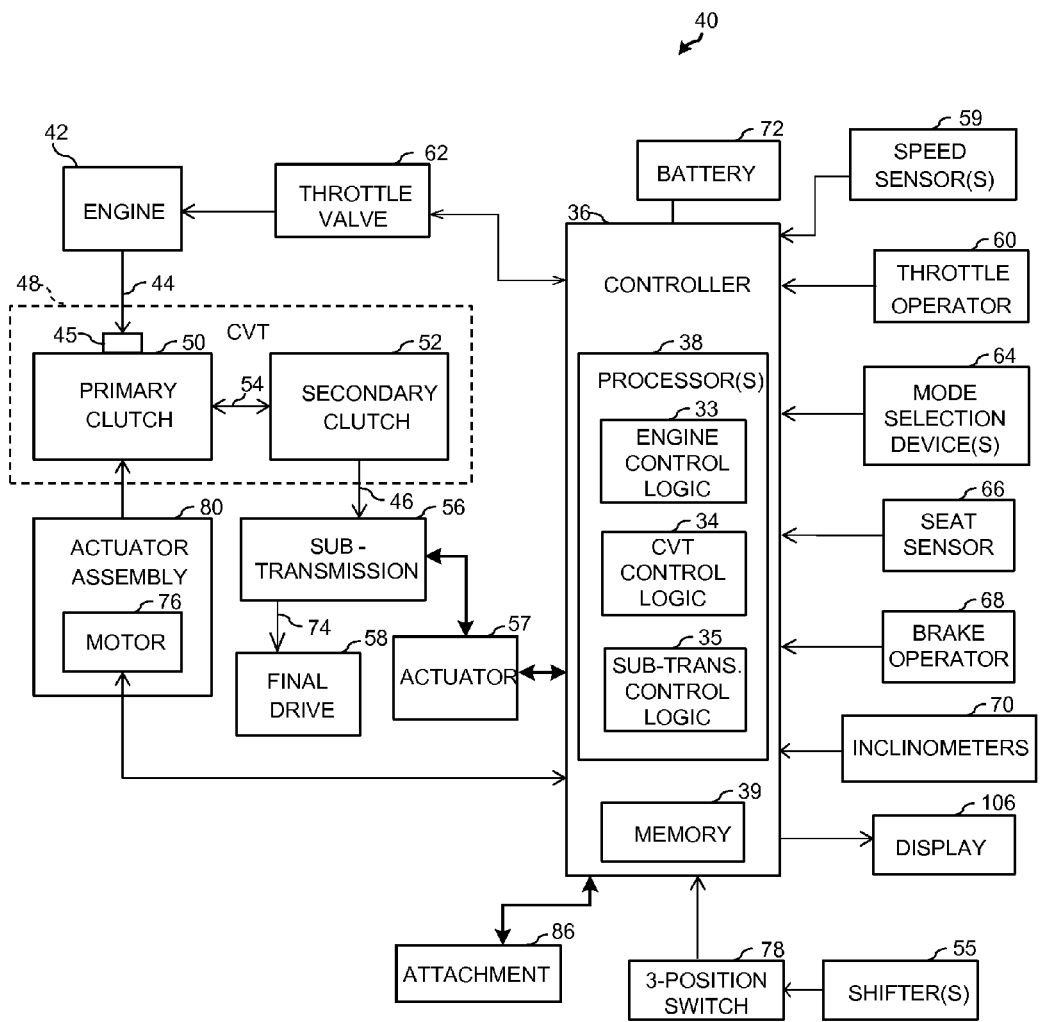
FIG. 2 is a block diagram of an exemplary control system of the vehicle of FIG. 1 including a continuously variable transmission (CVT) and a sub-transmission.

Referring to FIG. 2, an exemplary control system 40 of vehicle 10 of FIG. 1 is illustrated including an engine 42 and a continuously variable transmission (CVT) 48. CVT 48 includes a primary or drive clutch 50 and a secondary or driven clutch 52. An endless, variable speed belt 54 is coupled to the primary and secondary clutches 50, 52. Engine 42 includes an output shaft 44 configured to drive primary clutch 50 of CVT 48. Rotation of primary clutch 50 is transferred to secondary clutch 52 via belt 54. An output shaft 46 of secondary clutch 52 is coupled to and drives a sub-transmission 56, and an output shaft 74 of sub-transmission 56 is coupled to a final drive 58 for driving wheels 24 (see FIG. 1). In one embodiment, sub-transmission 56 is geared to provide a high forward gear, a low forward gear, a reverse gear, a neutral gear, and a park configuration for vehicle 10 of FIG. 1. Fewer or additional gear configurations may be provided with sub-transmission 56. Final drive 58 includes drive line components downstream of sub-transmission 56, including an output shaft, one or more axles, differential(s), and driven wheels 24, for example.

An electronic controller 36 of control system 40 is operative to control CVT 48, engine 42, and sub-transmission 56, as described herein. Controller 36 includes at least one processor 38 that executes software and/or firmware stored in memory 39 of controller 36. The software/firmware code contains instructions that, when executed by processor 38, causes controller 36 to perform the functions described herein. Controller 36 may alternatively include one or more application-specific integrated circuits (ASICs), field-programmable gate arrays (FPGAs), digital signal processors (DSPs), hardwired logic, or combinations thereof. The processor(s) 38 of controller 36 illustratively include engine control logic 33 operative to control engine 42, CVT control logic 34 operative to control CVT 48, and sub-transmission control logic 35 operative to control sub-transmission 56. Controller 36 may be a single control unit or multiple control units functioning together to perform the functions of controller 36 described herein. Controller 36 may include additional components for routing signals to and from controller 36. Engine control logic 33, CVT control logic 34, and sub-transmission logic 35 may be provided on a same processing device or two or more different processing devices. For example, in one embodiment CVT control logic 34 and sub-transmission logic 35 are provided on a designated vehicle or transmission control module physically separate from and in communication with an engine control module (ECM) of vehicle 10 that contains engine control logic 33. Other suitable controller arrangements may be provided.

Memory 39 is any suitable computer readable medium that is accessible by processor 38. Memory 39 may be a single storage device or multiple storage devices, may be located internally or externally to controller 36, and may include both volatile and non-volatile media. Exemplary memory 39 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 36.

Primary clutch 50 of CVT 48 rotates on a shaft that is driven by the output shaft 44 of engine 42. In one embodiment, primary clutch 50 includes a stationary sheave and a moveable sheave that moves relative to the stationary sheave to adjust the gear ratio. CVT control logic 34 of controller 36 is operative to control an actuator assembly 80 for controlling the position of the moveable sheave of primary clutch 50 and thus the gear ratio of CVT 48. In particular, actuator assembly 80 includes a motor 76 controlled by CVT control logic 34 that adjusts primary clutch 50 to provide a target gear ratio. In an exemplary embodiment, motor 76 is an electric motor such as a stepper motor, for example, although another suitable electric or hydraulic motor may be provided. In one embodiment, actuator assembly 80 and/or controller 36 includes a motor drive that controls motor 76 based on control signals provided with CVT control logic

34. Alternatively, CVT control logic 34 may control a relay for selectively routing power to motor 76 for controlling motor 76.

In one embodiment, secondary clutch 52 is a mechanically controlled clutch 52 and includes a stationary sheave and a moveable sheave (not shown). Secondary clutch 52 is configured to control the tension of belt 54 of CVT 48 as primary clutch 50 is adjusted. In an alternative embodiment, controller 36 and actuator assembly 80 may further control secondary clutch 52 of CVT 48. A shaft 46 of secondary clutch 52 drives sub-transmission 56 (see FIG. 2). Belt 54 wraps around the primary and secondary clutches 50, 52 and transfers rotational motion of primary clutch 50 to secondary clutch 52.

A clutch assembly 45 is coupled to output shaft 44 of engine 42 to serve as a starting or launch clutch for primary clutch 50. In one embodiment, clutch assembly 45 is a dry centrifugal clutch integrated into primary clutch 50. Clutch assembly 45 is disengaged from primary clutch 50 when engine 42 is at engine idle speed. As the engine speed and the corresponding rotational speed of clutch assembly 45 increases to a threshold speed greater than engine idle speed, the centrifugal force acting on clutch assembly 45 forces clutch assembly 45 into engagement with primary clutch 50. When the rotational speed of shaft 44 decreases below the threshold clutch engagement speed, the reduced centrifugal force causes clutch assembly 45 to disengage from primary clutch 50 of CVT 48.

For additional details of an exemplary CVT 48, see U.S. patent application Ser. No. 13/652,253, filed Oct. 15, 2012, entitled PRIMARY CLUTCH ELECTRONIC CVT, the entire disclosure of which is expressly incorporated by reference herein.

Sub-transmission control logic 35 of FIG. 2 is operative to control an actuator 57 for controlling a gear position of sub-transmission 56. In one embodiment, actuator 57 is mounted to sub-transmission 56. In an exemplary embodiment, actuator 57 includes an electric motor, such as a stepper motor or other suitable motor, although any suitable actuator 57 may be provided. Controller 36 and/or actuator 57 includes a motor drive that controls the motor based on control signals provided with sub-transmission control logic 35. Alternatively, sub-transmission control logic 35 may control a relay for selectively routing power to actuator 57 for controlling actuator 57. In one embodiment, actuator 57 includes a manual override that allows sub-transmission 56 to be manually shifted by an operator with a mechanical tool.

Still referring to FIG. 2, a throttle operator 60 including a position sensor is coupled to an input of controller 36, and engine control logic 33 electronically controls the position of a throttle valve 62 of engine 42 based on the detected position of throttle operator 60 to regulate air intake to and thus the speed of engine 42. Throttle operator 60 may include an accelerator pedal, a thumb actuated lever, a twist grip, or any other suitable throttle input device that, when actuated by an operator, is configured to provide an operator throttle demand to controller 36. For additional disclosure of electronic throttle control provided with controller 36, see U.S. patent application Ser. No. 13/152,981, filed Jun. 3, 2011, entitled ELECTRONIC THROTTLE CONTROL, the entire disclosure of which is expressly incorporated by reference herein.

A brake operator 68 including a position or pressure sensor is also coupled to an input of controller 36. Brake operator 68 includes, for example, a foot pedal, a hand brake, or another suitable brake input device. Controller 36 detects an application (e.g., actuation) of brake operator 68 based on a signal provided by the position or pressure sensor of brake operator 68.

A display 106 is coupled to controller 36 for displaying vehicle operation information to an operator. Exemplary information provided on display 106 includes vehicle speed, engine speed, fuel level, clutch position or gear ratio of CVT 48, gear configuration of sub-transmission 56, selected operating mode, and other suitable information.

Vehicle 10 further includes one or more shifters 55 actuated by an operator for sending shift requests to controller 36 for shifting between gears of sub-transmission 56, as described herein. In one embodiment, shifter 55 includes shift device 29 of FIGS. 1, 6, and 7. Speed sensors 59 provide signals to controller 36 representative of an engine speed, a wheel (ground) speed, a rotational speed of primary clutch 50 and/or secondary clutch 52, and/or a speed of other components of the vehicle drive train. One or more mode selection devices 64 in communication with controller 36 are actuated by an operator to select an operating mode of vehicle 10. Exemplary operating modes include a plow mode, a work mode, a snow/ice mode, a sport mode, a learner mode, and other suitable modes. In one embodiment, engine control logic 33 provides variable throttle response curves based on the selected mode, for example as described in U.S. patent application Ser. No. 13/152,981, filed Jun. 3, 2011, entitled ELECTRONIC THROTTLE CONTROL, the entire disclosure of which is expressly incorporated by reference herein. Mode selection device 64 includes a toggle switch or a code entered via display 106, for example. In one embodiment, mode selection device 64 includes an ignition key having an identifier (e.g., RFID) that is readable by controller 36 for selecting a particular mode of operation. As described herein, sub-transmission 56 is controlled based on the selected operating mode.

Figure 8:
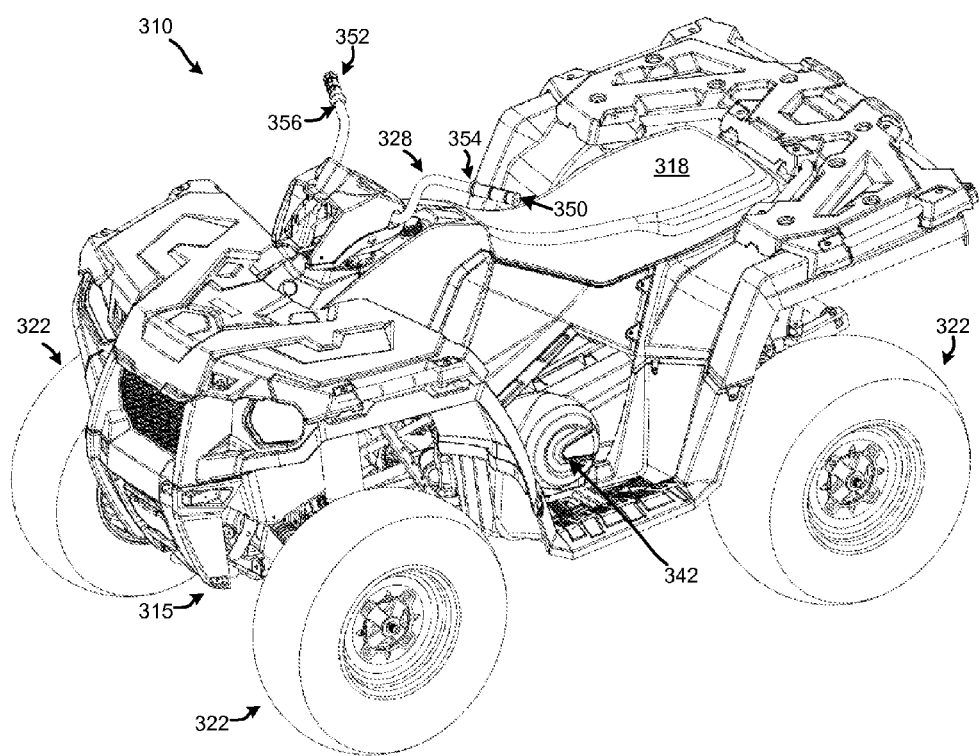
FIG. 8 is a perspective view of another exemplary vehicle incorporating the electronically controlled sub-transmission of the present disclosure.

A seat sensor or switch 66 in communication with controller 36 provides signal feedback to controller 36 indicative of the presence or absence of a load (i.e., an operator) positioned in seat 18*a* (and/or seat 18*b*) of FIG. 1 (or seat 318 of FIG. 8). In one embodiment, controller 36 determines seat 18*a* is in a loaded state in response to detecting with sensor 66 a force on seat 18*a* greater than or equal to a predetermined threshold force and that seat 18*a* is in an unloaded state in response to the detected force being less than the threshold force. An exemplary threshold force is 50 pounds or any other suitable force. For additional details of an exemplary seat sensor 66, see U.S. patent application Ser. No. 13/725,361, filed Dec. 21, 2012, entitled SIDE-BY-SIDE DIESEL UTILITY VEHICLE, the entire disclosure of which is expressly incorporated by reference herein.

Vehicle 10 includes one or more inclinometers 70 in communication with controller 36 for detecting an incline or angle of vehicle relative to a horizontal plane. Vehicle 10 further includes a system battery 72 (e.g. 12 VDC) configured to provide power for starting vehicle 10 and to provide peripheral power to vehicle 10 during operation. In one embodiment, controller 36 communicates with one or more sensors/devices and/or controllers of vehicle 10 via controller area network (CAN) communication.

Controller 36 of FIG. 2 is operative to electronically shift sub-transmission 56 based on a shift request provided with shifter 55. In the illustrated embodiment, sub-transmission 56 includes a high-range forward gear, a low-range forward gear, a low-range reverse gear, a neutral gear, and a park gear. The low range forward gear provides increased power and lower speed operation than the high range forward gear. For example, the low range gear may be used for towing, plowing, rock crawling, hauling, or other work operations, and the high range gear may be used for traveling at higher speeds or in non-loaded conditions. Other suitable gear configurations of sub-transmission 56 may be provided.

Figure 3:
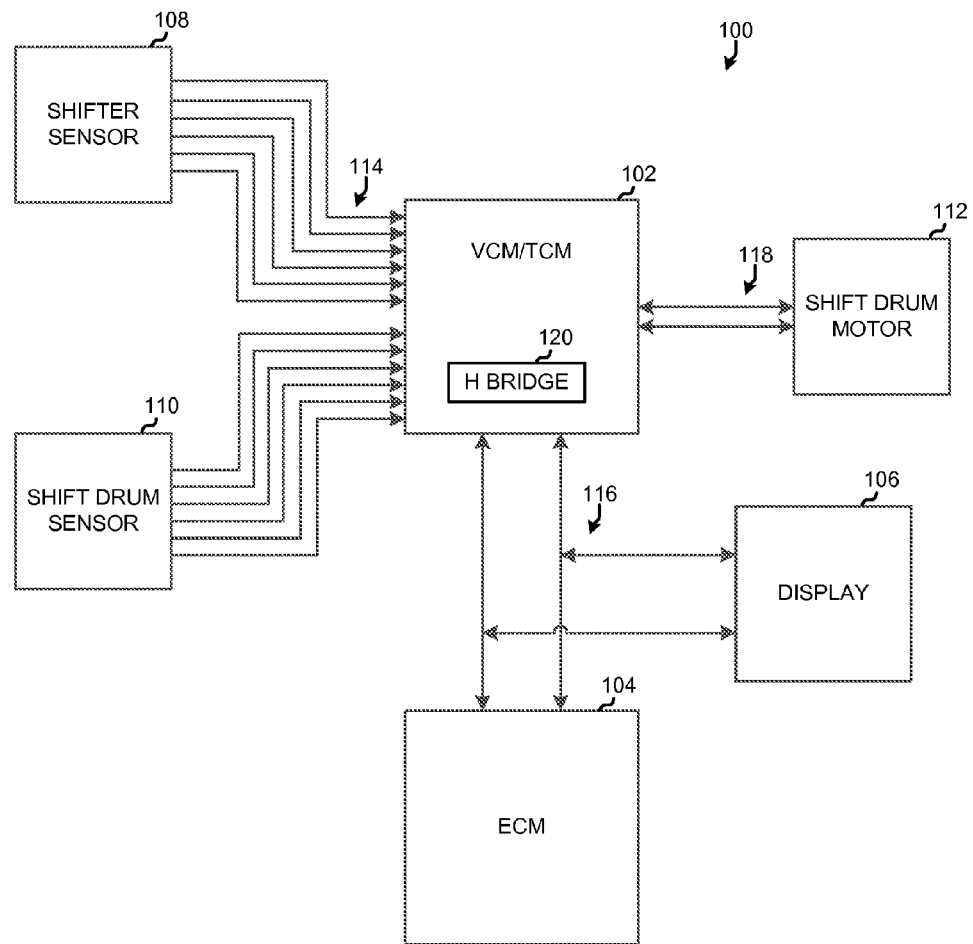
FIG. 3 is a block diagram of an exemplary implementation of the control system of FIG. 2 including a vehicle control module in communication with an engine control module.

FIG. 3 illustrates one exemplary configuration 100 of control system 40 of FIG. 2 for controlling electronic shifting of sub-transmission 56. Referring to FIG. 3, controller 36 of FIG. 2 includes a vehicle control module (VCM) 102 (or transmission control module TCM) in communication with an engine control module (ECM) 104. A sensor 108 of shifter 55 (FIG. 2) is a rotary position sensor that senses the "Requested Gear" from the user and transmits that information via analog signal to VCM 102. Another suitable signal output may be provided with shifter 55 that is configured to output a shift request signal indicative of an actuation of shifter 55. A sensor 110 on a shift drum of sub-transmission 56 (FIG. 2) is a rotary position sensor that senses the "Current Gear" of sub-transmission 56 and transmits that information via analog signal to VCM 102. Sensors 108 and 110 may alternatively transmit digital signals. Sensors 108 and 110 illustratively include redundant signal lines 114 as well as full redundant power supply and ground lines 114 to increase the likelihood of desired operation. In one embodiment, full diagnostics are available on these inputs. VCM 102 also includes redundancy checks in the software on the signal lines 114 so that the correct gear is requested and determined.

ECM 104 broadcasts out "RPM" and "Wheel Speed" CAN signals via lines 116 and receives the "Current Gear" from VCM 102. If the "Current Gear" is unknown from VCM 102, ECM 104 defaults to a backup gear determination by accessing a memory lookup table based on RPM and Wheel Speed to determine the current gear of sub-transmission 56.

VCM 102 receives the analog inputs 114 as well as "RPM" and "Wheel Speed" inputs from ECM 104 via CAN lines 116 to make decisions on whether to execute a shift request from the user. In one embodiment, VCM 102 does not allow a shift above a calibrated RPM or wheel speed threshold to protect the transmission from unintended damage, as described herein. In certain conditions, VCM 102 disables electronic shifting and defaults to a "Mechanical Override Mode" if VCM 102 determines sub-transmission 56 cannot suitably shift, such as due to a loss of an input signal (e.g. signal from sensor 110, ECM 104, or an interlock described herein), for example. In Mechanical Override Mode, sub-transmission 56 may be shifted via a mechanical tool, such as a wrench or other tool.

An electric direct current (DC) motor 112 of actuator 57 (FIG. 2) receives a signal from VCM 102 to shift sub-transmission 56 to the requested gear. In one embodiment, current sensing and full diagnostics are available on this output from VCM 102. VCM 102 includes an H-bridge 120 that drives the DC control of motor 112 via lines 118. H-bridge 120 includes an electronic circuit configured to enable voltage to be applied to motor 112 in either direction to rotate the output shaft 44 of motor 112 in either direction, thereby allowing shifting in either direction through the gear range. In the illustrated embodiment, H-bridge 120 is located in the VCM 102 and is remote from motor 112. An analog or digital signal is output by H-bridge 120 to drive output shaft 44 of motor 112 a known rotational distance in the forward or reverse direction. VCM 102 detects the current position of motor 112 via shift drum sensor 110. VCM 102 stores calibrated set points identifying a rotational position of output shaft 44 of motor 112 that corresponds to each gear. Position tolerances are detected by controller 36 via H-bridge 120 based on a detected voltage, such as a zero to five volt signal. Controller 36 commands a target rotational position of output shaft 44 of motor 112 based on a target rotational position of output shaft 44 and a known tolerance.

In the illustrated embodiment, sub-transmission 56 includes adaptive range sensors (e.g., sensor 110) that provide position feedback to VCM 102. VCM 102 is operative to tighten tolerances for each gear position. In particular, by identifying the actual transmission position from sensor 110 and identifying the position tolerances, VCM 102 is operative to drive sub-transmission 56 to a predefined position.

Display 106 receives both "Requested Gear" and "Current Gear" from the CAN bus 116 and displays the "Requested Gear" when it matches "Current Gear." If "Requested Gear" and "Current Gear" do not match, display 106 flashes the "Requested Gear" to provide an indication to the user that a gear shift has been requested but not executed based on suitability checks not being met in VCM 102.

Figure 4:
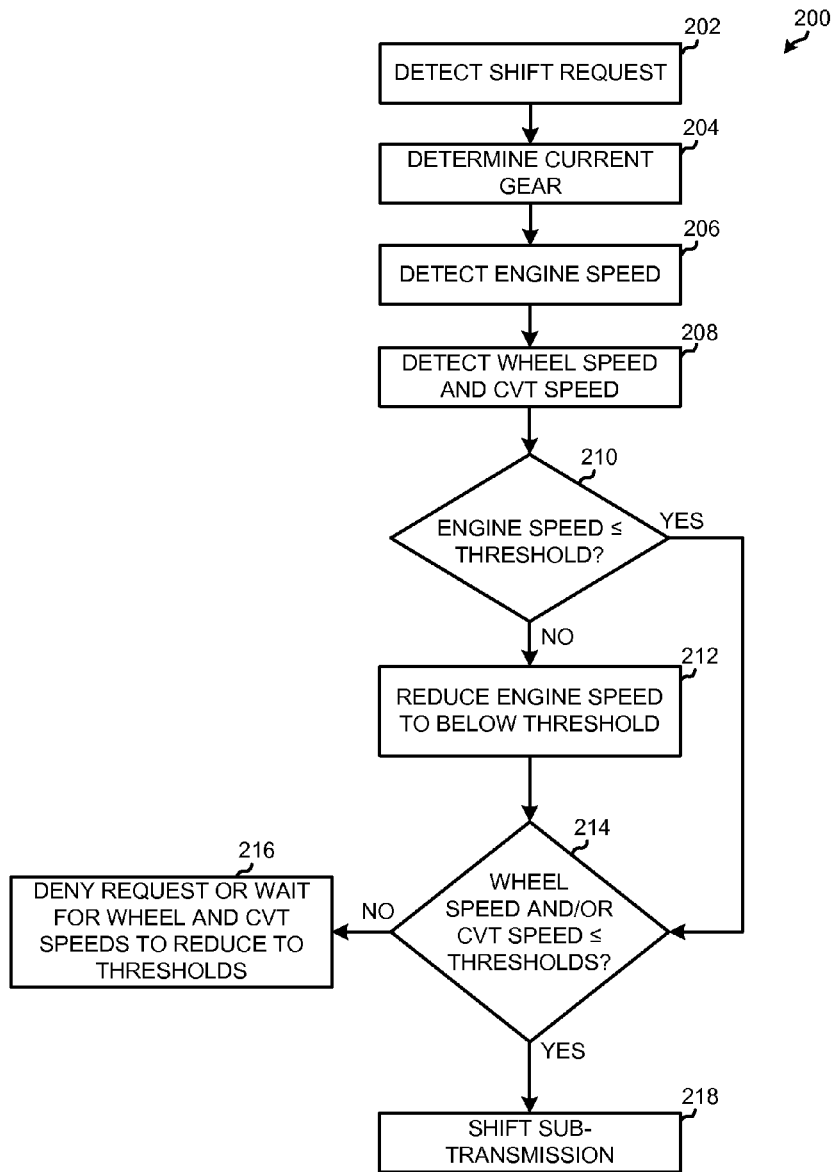
FIG. 4 is a block diagram illustrating an exemplary control strategy for electronically controlling the sub-transmission of FIG. 2.

Referring to FIG. 4, a flow diagram 200 is illustrated of an exemplary operation performed by controller 36 of FIG. 2 for electronically shifting sub-transmission 56. Reference is made to FIG. 2 throughout the following description of FIG. 4. At block 202, controller 36 detects a shift request initiated with shift device 55 that identifies a target gear configuration of sub-transmission 56. Controller 36 determines the current gear configuration of sub-transmission 56 at block 204 based on output from a position sensor (e.g., shift drum sensor 110 of FIG. 3). At block 206, controller 36 detects the engine speed (e.g., rotational speed of output shaft 44) based on output from an engine speed sensor. At block 208, controller 36 detects the wheel or ground speed and CVT speed based on output from speed sensors 59 of FIG. 2. In one embodiment, a wheel speed sensor is coupled to and detects the rotational speed of output shaft 74 of sub-transmission 56 and/or an axle or wheel of final drive 58. In one embodiment, a CVT speed sensor detects the rotational speed of secondary clutch 52 (e.g., shaft 46 of FIG. 2) and/or primary clutch 50 of CVT 48.

At block 210, controller 36 compares the detected engine speed to an engine speed threshold. At block 214, controller 36 compares the detected wheel speed and/or CVT speed to respective speed thresholds. If the engine speed is less than or equal to the engine speed threshold at block 210 and if the wheel speed and CVT speed are less than or equal to the respective speed thresholds at block 214, controller 36 shifts sub-transmission 56 to the target gear configuration by outputting a control signal to actuator 57 at block 218.

If the engine speed is greater than the engine speed threshold at block 210, controller 36 reduces the engine speed to at or below the threshold speed at block 212 prior to implementing the gear shift. In one embodiment, controller 36 reduces the engine speed by reducing the throttle valve opening of engine 42. If the wheel speed is greater than the wheel speed threshold at block 214, or if the CVT speed is greater than the CVT speed threshold at block 214, controller 36 at block 216 either denies the shift request immediately or waits a predetermined time delay for the wheel speed and/or CVT speeds to reduce to the respective speed threshold. In one embodiment, if the wheel speed and/or CVT speed do not reduce to the corresponding threshold prior to expiration of the predetermined time delay (e.g., 30 seconds), controller 36 denies the shift request (e.g., clears the shift request without implementing the request).

In one embodiment, the status of the gearshift is displayed on display 106 of FIG. 2. For example, display 106 flashes "Requested Gear" to provide an indication the gear shift has been requested but not implemented due to the engine speed and wheel/CVT speeds not meeting thresholds or other suitability checks not being satisfied. Display 106 also provides an indication when the gear shift has been executed and denied.

In one embodiment, the threshold engine speed of block 210 is based on the engagement speed at which clutch assembly 45 engages primary clutch 50 of CVT 48. For example, the threshold engine speed is set to a speed less than the clutch engagement speed described herein to ensure that engine 42 is decoupled from CVT 48 when the gear shift occurs. In another embodiment, the threshold engine speed of block 210 is based on the speed at which primary clutch 50 of CVT 48 engages belt 54. For example, in one embodiment, primary clutch 50 engages belt 54 in response to a speed of primary clutch 50 exceeding a belt engagement speed threshold. The threshold engine speed is set to a speed less than the belt engagement speed to ensure that primary clutch 50 is decoupled from belt 54 when the gear shift occurs. In one embodiment, the threshold wheel speed at block 214 is zero miles per hour (mph) or between zero and 5 mph. In one embodiment, the threshold CVT speed at block 214 is zero or between zero and 50 rpm. Other suitable threshold speeds may be provided at blocks 210 and 214.

In one embodiment, the method 200 of FIG. 4 allows controller 36 to verify that the engine speed, wheel speed, and CVT speed are at suitable levels before shifting sub-transmission 56 to reduce the likelihood of causing damage to the drive line of vehicle 10. For example, sub-transmission 56 is less likely to grind gears during a shift by waiting until the wheel speed and CVT speed are substantially zero prior to shifting. Similarly, by requiring the engine speed to be below the clutch engagement threshold speed, CVT 48 is decoupled from the output of engine 42 prior to shifting sub-transmission 56.

Figure 5:
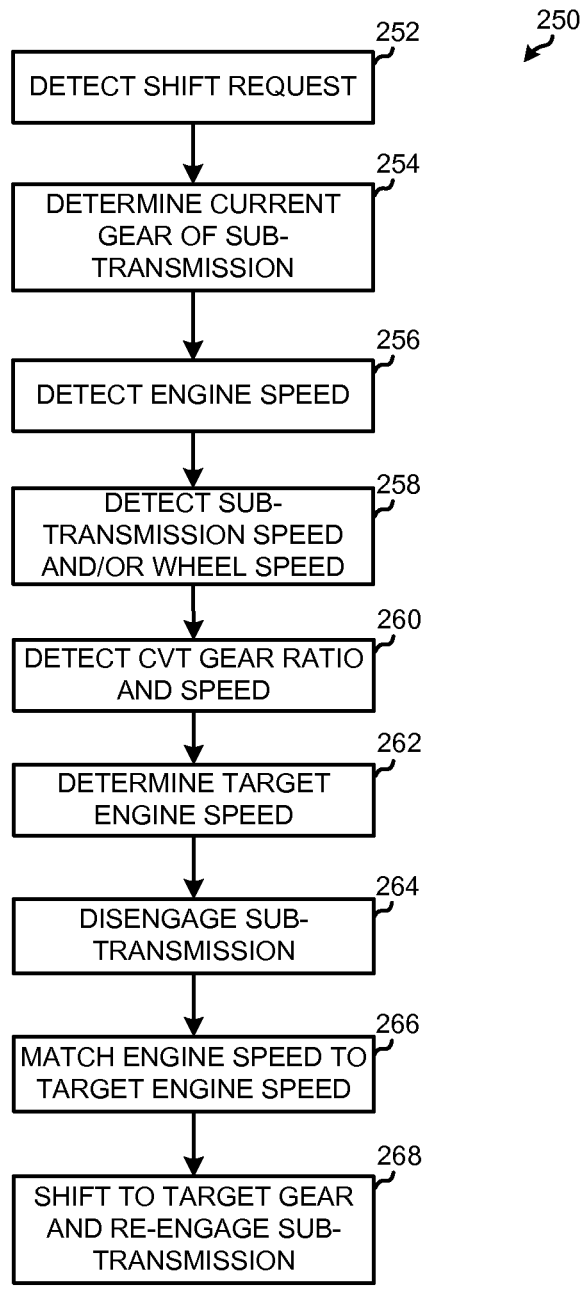
FIG. 5 is a block diagram illustrating another exemplary control strategy for electronically controlling the sub-transmission of FIG. 2.

Referring to FIG. 5, a flow diagram 250 is illustrated of another exemplary operation performed by control system 40 of FIG. 2 for electronically shifting sub-transmission 56. The method of FIG. 5 illustratively controls a rolling shift (e.g., shift on the fly) such that sub-transmission 56 is shifted while vehicle 10 is moving. In one embodiment, a rolling shift is only allowed by controller 36 when shifting between forward gears (e.g., between high range and low range) or when shifting between neutral gear and forward or reverse gear, although other suitable shifting conditions may be provided for a rolling shift. Reference is made to FIG. 2 throughout the following description of FIG. 5.

At block 252, controller 36 detects a shift request initiated with shift device 55 that identifies a target gear configuration of sub-transmission 56. Controller 36 determines the current gear configuration of sub-transmission 56 at block 254 based on output from a position sensor (e.g., shift drum sensor 110 of FIG. 3). At block 256, controller 36 detects the engine speed. At block 258, controller 36 detects the speed of sub-transmission 56 and/or the wheel (ground) speed. At block 260, controller 36 determines the gear ratio of CVT 48 and a speed of CVT 48, illustratively the speed of output shaft 46 of FIG. 2. At block 262, controller 36 determines a target engine speed based on the current and target gear configurations of sub-transmission 56, the gear ratio of CVT 48, the output speed of CVT 48 (e.g., speed of output shaft 46 of secondary clutch 52), and the wheel speed and/or speed of sub-transmission 56. For example, controller 36 determines the target engine speed required to drive CVT 48 such that the speed of output shaft 46 of CVT 48 will match the speed of the input of sub-transmission 56 after sub-transmission 56 is shifted to the requested target gear. For example, the speeds of output shaft 46 and the input of sub-transmission 56 match when the rotational speeds are the same or are within a predefined range of each other, such as within 50 RPM, for example. Accordingly, the likelihood of grinding or damaging gears and other components of sub-transmission 56 during a rolling shift is reduced.

At block 264, controller 36 disengages sub-transmission 56 from CVT 48. In one embodiment, disengaging sub-transmission 56 includes shifting sub-transmission 56 to a neutral space or dead spot between gear positions. In another embodiment, sub-transmission 56 includes a clutch controlled by controller 36 to disengage sub-transmission 56 from CVT 48. At block 266, while sub-transmission 56 is disengaged, controller 36 adjusts the engine speed to match the target engine speed calculated at block 262 by electronically controlling throttle valve assembly 62 of FIG. 2. In the illustrated embodiment, the engine speed matches the target engine speed when the engine speed is the same as the target engine speed or is within a predetermined threshold range of the target engine speed, such as within 50 RPM, for example. When the engine speed sufficiently matches the target engine speed, and thereby the speed of output shaft 46 sufficiently matches the post-shift input speed of sub-transmission 56, controller 36 at block 268 shifts sub-transmission 56 to the target gear identified in the shift request and re-engages sub-transmission 56 to CVT 48. As described herein, controller 36 shifts sub-transmission 56 by outputting a shift command to actuator 57. In an embodiment with a clutch disengaging sub-transmission 56 from CVT 48, controller 36 drives engine 42 to the target speed before, during, or after shifting sub-transmission 56 to the target gear and before re-engaging sub-transmission 56 via the clutch.

Referring again to FIG. 2, controller 36 is further operative to lock out one or more gears of sub-transmission 56 in response to a detected operating condition and/or user input. For example, in one embodiment controller 36 selectively locks out gears of sub-transmission based on an operating mode selected by the user via mode selection device 64 of FIG. 2. For example, in some modes, such as plow mode, work mode, rock crawling mode, snow/ice mode, and/or learner mode, controller 36 locks out high range forward gear such that the user cannot select high range or such that an override input is required to select high range. An override input may include a code or other input via display 106 of FIG. 2.

In one embodiment, controller 36 locks out one or more gears, such as high range gear, in response to detecting a seat belt being disengaged and/or the operator leaving seat 18a (FIG. 1). Controller detects the loaded and unloaded state of seat 18a based on the force detected with seat sensor 66, as described herein. If vehicle 10 is being driven in high range gear when the disengaged seat belt or unloaded seat 18a is detected, controller 36 in one embodiment automatically shifts sub-transmission 56 into the low range gear and locks out high range until the seat belt is engaged and the seat 18a is in the loaded state. A suitable time delay (e.g., one to five seconds, etc.) may be implemented after detecting the unloaded seat or disengaged seat belt before automatically shifting into the low range gear. Controller 46 may further reduce or limit the throttle opening to a threshold opening upon detecting the unloaded seat or disengaged seat belt. In one embodiment, when sub-transmission 56 is in park or neutral while engine 42 is running, controller 36 locks out the forward and reverse gears until the seat belt is engaged and the operator is positioned in seat 18a. Other interlocks may be monitored in addition to the seat belt and seat 18a engagement, such as the engagement of side nets or doors of vehicle 10. In one embodiment, controller 36 locks out one or more gears of sub-transmission 56 by ignoring or not executing shift requests for the locked out gears.

In one embodiment, controller 36 is operative to automatically shift sub-transmission 56 into park or neutral in response to vehicle 10 being turned off and the operator leaving seat 18a (FIG. 1). For example, in response to detecting the engine 42 or vehicle 10 shutting down and seat 18a being in an unloaded state, controller 36 automatically shifts sub-transmission 56 into park or neutral after a predetermined time delay (e.g., 30 seconds). In one embodiment, controller 36 automatically shifts sub-transmission 56 into park under these conditions only when vehicle 10 is positioned at an incline which exceeds a threshold inclination angle, as determined with inclinometers 70 of FIG. 2. As such, vehicle 10 may be less likely to roll down a hill when vehicle 10 is left unattended by an operator. In one embodiment, a user input may override the automatic park to allow vehicle 10 to be towed when engine 42 or vehicle 10 is shutdown. For example, controller 36 allows a user to shift sub-transmission 56 into neutral while engine 42 is shut down to disengage CVT 48 from final drive 58 for towing operations.

In one embodiment, controller 36 automatically shifts sub-transmission 56 into park from a forward or reverse gear in response to all of the following conditions being met: engine 42 running at idle speed or below the clutch engagement speed, the wheel speed being zero, seat 18a being unoccupied for a threshold duration, and the incline of vehicle 10 exceeding the threshold inclination angle.

In one embodiment, controller 36 is further operative to lock sub-transmission 56 in the park gear when vehicle 10 is shut down, either automatically as described herein or in response to a lockout request by a user (e.g., a code entered). When locked in park, controller 36 requires a set of conditions to be satisfied before allowing sub-transmission 56 to shift out of the park configuration. For example, controller 36 requires one or more of the following conditions to be met before shifting out of park: the presence of a key is detected in the ignition or near the ignition (via RFID or key fob), seat 18a is in the loaded state, the seat belt is engaged, and a brake interlock is satisfied. In one embodiment, controller 36 further requires engine 42 to be running to execute a shift request for shifting out of park. For the brake interlock, controller 36 detects an application of brake operator 68 of FIG. 2 based on feedback provided by the brake operator sensor (e.g., pressure sensor or position sensor). In this embodiment, controller 36 requires brake operator 68 to be engaged by the operator by a threshold pressure or displacement amount prior to shifting into park.

In one embodiment, the conditions for unlocking or locking a particular gear are displayed on display 106. For example, the conditions for shifting sub-transmission 56 out of park are listed on display 106 to inform the operator what steps to take to shift out of park. Similarly, the interlocks and corresponding locked out gears are displayed on display 106, such as when the seat belt, doors, or side nets are disengaged and the seat is unoccupied.

In one embodiment, engine 42 is configured to operate in a power generation mode. The generated power output by engine 42 is used, for example, to power a hydraulic pump or generate electricity. Power generation mode is selectable via mode selection device 64 of FIG. 2. In the power generation mode, controller 36 shifts sub-transmission 56 into the neutral gear position to decouple the output of engine 42 and CVT 48 from the final drive 58. Controller 36 is operative to lock out other gear configurations of sub-transmission 56 during the power generation mode regardless of a shift request for a different gear configuration.

Figure 6:
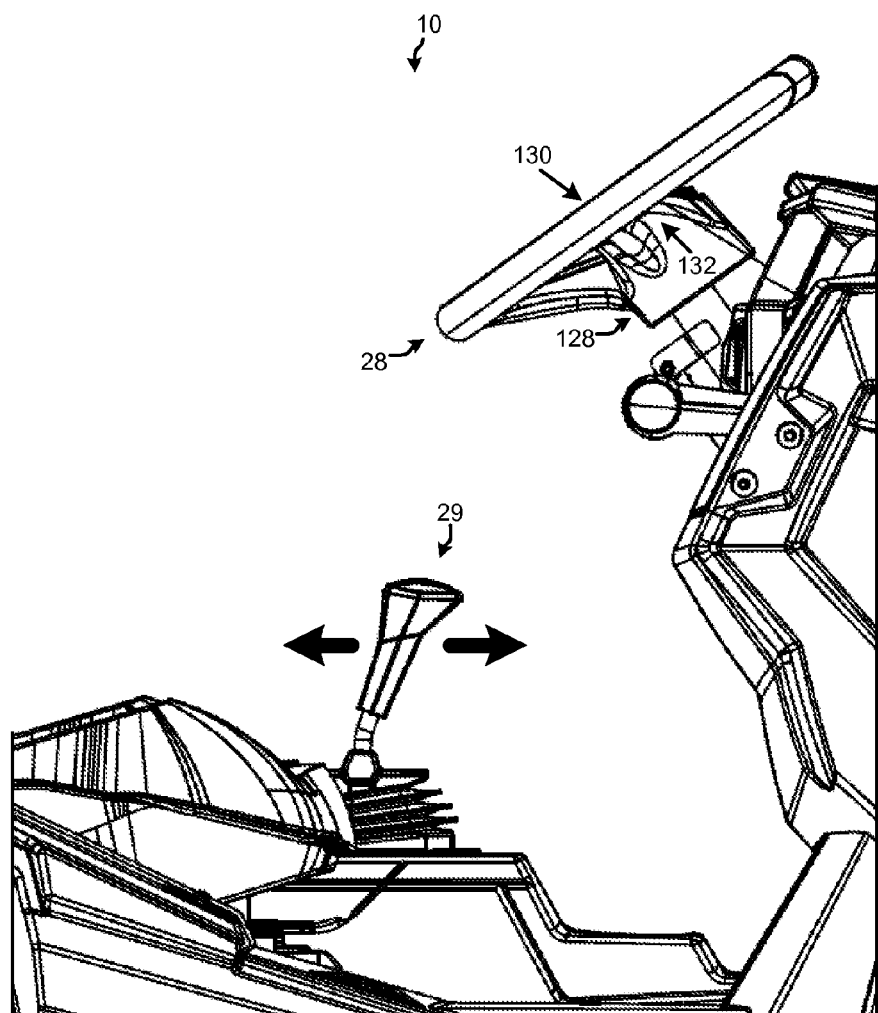
FIG. 6 is a perspective partial side view of the vehicle of FIG. 1 illustrating a shift device and a steering wheel according to an embodiment.

Referring to FIG. 6, an exemplary shifter 55 of FIG. 2 is illustrated in the form of a shift handle or lever 29 positioned between seats 18a and 18b of vehicle 10 (FIG. 1). Shift handle 29 is configured to move in the forward (shift up) direction toward the front of vehicle 10 and the backward (shift down) direction toward the rear of vehicle to allow an operator to shift through the gear positions of sub-transmission 56. Shift handle 29 is coupled to a shift sensor for communicating the shifter position to controller 36. In one embodiment, the shift sensor includes a three-position, momentary ON-OFF-ON toggle switch 78 (see FIG. 2). Switch 78 is spring-biased to the middle OFF position, and moving shift handle 29 forward or backward causes contacts of switch 78 to engage an ON position to generate a corresponding shift request to controller 36. Accordingly, shift handle 29 is biased to the middle position illustrated in FIG. 6, and actuation of shift handle 29 forward or reverse initiates a shift request.

In the illustrated embodiment, the duration of input provided with shift handle 29 serves to request a different sub-transmission gear position. For example, shift handle 29 may be actuated for a short hold (short duration) or a long hold (long duration). A short hold is an actuation of the shift handle 29 to the forward or backward position held for less than a threshold duration, and a long hold is an actuation of shift handle 29 in the forward or backward position held for longer than the threshold duration. An exemplary threshold duration is 300 milliseconds (ms), 500 ms, or another suitable threshold duration programmed into controller 36. In one embodiment, the shift input provided by shift handle 29 is filtered by controller 36 to reduce the likelihood of shifting in response to an inadvertent shift request, such as a shift request resulting from an accidental bump to shift handle 29, for example. An exemplary filter includes controller 36 ignoring shifter actuations held for less than a second threshold duration, such as 100 ms, for example.

In the illustrated embodiment, a short hold on shift handle 29 in the forward or backward position allows for stepping through the gear range of sub-transmission 56. An exemplary gear range pattern is park-reverse-neutral-low range forward-high range forward (PRNLH). With sub-transmission 56 in the park gear position, actuation of shift handle 29 forward for a short duration requests reverse gear, a subsequent forward short hold actuation requests neutral gear, a subsequent forward short hold actuation requests low range, and a subsequent forward short hold actuation requests high range. Similarly, reverse short hold actuations on shift handle 29 result in stepping backward through the gear range of sub-transmission 56.

In one embodiment, a long hold on shift handle 29 provides for shifting directly to the end gear position of the gear range based on the direction shift handle 29 is actuated. For example, in the PRNLH gear pattern, when sub-transmission 56 is in park, reverse, neutral, or low range, a long hold actuation of shift handle 29 in the forward direction generates a shift request for the high range. Similarly, when sub-transmission 56 is in reverse, neutral, low range, or high range, a long hold actuation of shift handle 29 in the backward direction generates a shift request for the park position.

In one embodiment, the long hold input with shift handle 29 is configured differently for different operating modes. For example, in the plow mode or work mode, a long hold on shift handle 29 in the forward or backward direction causes sub-transmission 56 to shift directly between low forward range and reverse gears, respectively. The configuration of the long hold input is selectable by an operator based on the operating mode selected with mode selection device 64 of FIG. 2. In one embodiment, the long hold input configuration is programmable into controller 36 via a user input (e.g., via buttons of display 106 or other input device) to identify which gears are selected in response to long hold actuations of shift handle 29.

In another embodiment, shift handle 29 is moveable to a different detent position for each different gear of sub-transmission 56. Based on the position of shift handle 29, controller 36 shifts sub-transmission 56 to a different gear position. In the PRNLH gear range described above, shift handle 29 has five different detent positions each corresponding to one of park, reverse, neutral, low forward range, and high forward range.

In an alternative embodiment, shifter 55 of FIG. 2 is separated into right-hand and left-hand controls provided with two shift devices, such as paddles or buttons, coupled on or near steering wheel 28. For example, right- and left-hand shift devices 55 of FIG. 2 may be coupled to the right and left side of steering wheel 28 near position 130 of FIG. 6 inside the outer perimeter of steering wheel 28. Similarly, right- and left-hand shift devices 55 may be coupled to opposite sides of steering column 128 behind steering wheel 28. For example, the right-hand shift device 55 may be coupled to steering column 128 at position 132 of FIG. 6, and the left-hand shift device 55 may be coupled at a similar position on the opposite side of steering column 128. As such, an operator may shift through the gear range of sub-transmission 56 while keeping both hands positioned on steering wheel 28.

For a straddle-type vehicle (e.g., all-terrain vehicle or snowmobile), the hand shifters 55 are coupled to right and left sides of the handlebar near the location of an operator's hands. Referring to FIG. 8, an exemplary straddle seat vehicle 310 is illustrated that incorporates the control system 40 of FIG. 2 and described herein. Straddle-type vehicle 310 includes a frame or chassis 315 that is supported above the ground surface by front and rear wheels 322. Vehicle 310 includes a straddle seat 318 positioned above an engine 342 and behind a steering device, illustratively a handlebar 328. Handlebar 328 includes a left grip 350 and a right grip 352. A left-hand shifter 55 (FIG. 2) is coupled to handlebar 328 at location 354, and a right-hand shifter 55 (FIG. 2) is coupled to handlebar 328 at location 356. Locations 354 and 356 are adjacent or near respective grips 350, 352 such that an operator may shift through the gear range of sub-transmission 56 (FIG. 2) while keeping both hands positioned on handlebar 328. Shifters 55 of straddle type vehicle 310 include paddles, buttons, or other suitable shift request devices.

In the embodiments of FIGS. 6 and 8 including right-hand and left-hand shift devices 55, each shift device 55 is coupled to a two position, ON-OFF momentary toggle switch biased in the OFF position. In one embodiment, each short hold actuation to the left-hand shift device 55 controls gear selections in the up direction (e.g., from park to high forward range), and each short hold actuation to the right-hand shift device 55 controls gear selections in the down direction (e.g., from high forward range to park), or vice versa. Similarly, a long hold actuation on right-hand or left-hand shift device 55 causes sub-transmission 56 to jump to a corresponding end of the gear range (e.g., high forward range for left hand device 55 and park for right-hand device 55) or to a configured particular gear based on the selected operating mode (e.g., shift directly between reverse and low forward range for work or plow mode).

Figure 7:
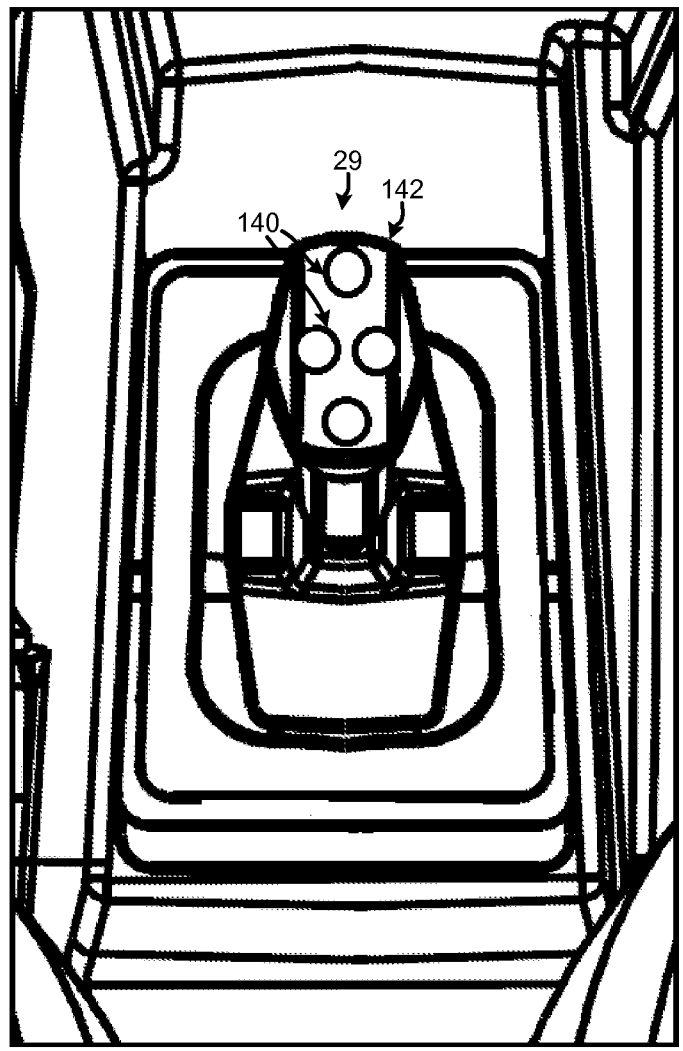
FIG. 7 is a perspective top view of the shift device of FIG. 6 including control input devices for controlling an accessory.

In one embodiment, shifter 55 of FIG. 2 includes one or more additional input devices, such as buttons or toggle switches, configured to control an implement or attachment 86 (FIG. 2) or other accessory coupled to the vehicle and controlled by controller 36. Referring to FIG. 7, shift handle 29 includes a plurality of buttons 140 coupled to a head portion 142 of shift handle 29. Buttons 140 are thumb or finger actuated, for example, to provide user accessibility without requiring the user to remove a hand from shift handle 29. Buttons 140 are in communication with controller 36 and provide various functionalities based on the operating mode selected with mode selection device 64 of FIG. 2. For example, in a plow mode, buttons 140 allow an operator to control the position and orientation of a plow blade or scoop attached to the front of vehicle 10. In a work mode, buttons 140 provide input to controller 36 for controlling a winch coupled to vehicle 10, i.e., for controlling the winch motor to retract and extend the winch cable. Buttons 140 may also be used to start, stop, and otherwise control power generation provided with engine 42 (FIG. 2) in a power generation mode. A position, orientation, and operation of a snow blower attachment may also be controlled with buttons 140. Other suitable functionality may be provided with buttons 140 for controlling an attachment 86 of vehicle 10.

In another embodiment, vehicle 10 of FIG. 1 includes a hydrostatic transmission rather than the CVT 48 of FIG. 2. In another embodiment, vehicle 10 includes a sequential transmission rather than the CVT 48 and sub-transmission 56 of FIG. 2. In this embodiment, the sequential transmission is electronically shifted by controller 36 according to the control strategies described herein. An exemplary gear range pattern of a sequential transmission includes reverse gear-first gear-second gear-third gear-fourth gear-fifth gear (R12345), and each gear is electronically controlled by controller 36 based on shift requests from shifter 55 of FIG. 2 as described with respect to sub-transmission 56 of FIG. 2. The sequential transmission may have fewer or additional gears.

While vehicle 10 of FIG. 1 and vehicle 310 of FIG. 8 are described herein as including an engine 42 as the power source, vehicle 10, 310 may alternatively include an electric motor as the power source for powering the drivetrain. Vehicle 10, 310 may also comprise a hybrid vehicle having both an electric motor and an engine.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A recreational vehicle including:
a chassis;
a ground engaging member configured to support the chassis;
a power source supported by the chassis, the power source including at least one of an engine and an electric motor;
a transmission including at least one of a continuously variable transmission and a hydrostatic transmission, the transmission being driven by the power source and having an adjustable gear ratio;

a sub-transmission coupled to the transmission, the sub-transmission having a plurality of selectable gear configurations including a forward gear and at least one of a park gear, a reverse gear, and a neutral gear;

an actuator operative to change a gear configuration of the sub-transmission;

a shift device including a signal output operative to provide a shift request signal indicative of a request to change the gear configuration of the sub-transmission;

a controller including at least one processor, the controller being operative to control the gear ratio of transmission and being in communication with the shift device and the actuator, the controller being operative to control the actuator to change the gear configuration of the sub-transmission in response to detecting the shift request signal provided by the shift device; and a speed sensor in communication with the controller for detecting an output speed of the power source, wherein the controller controls the actuator to change the gear configuration of the sub-transmission based on the shift request signal in response to the output speed being less than a speed threshold.

2. The recreational vehicle of claim 1, wherein when the output speed of the power source exceeds the speed threshold upon detecting the shift request, the controller is operative to control the power source to reduce the output speed of the power source prior to changing the gear configuration of the sub-transmission based on the shift request signal.

3. The recreational vehicle of claim 2, the transmission including the continuously variable transmission, the continuously variable transmission including a primary clutch, a secondary clutch, and a belt coupled between the primary clutch and the secondary clutch, the primary clutch engaging the belt in response to a speed of the primary clutch exceeding a belt engagement speed threshold, the speed threshold being less than or equal to the belt engagement speed threshold.

4. The recreational vehicle of claim 1, further including a speed sensor in communication with the controller for detecting a rotational speed of the transmission, wherein the controller controls the actuator to change the gear configuration of the sub-transmission based on the shift request signal in response to the rotational speed of the transmission being less than or equal to a transmission speed threshold.

5. The recreational vehicle of claim 4, wherein the transmission speed threshold is zero.

6. The recreational vehicle of claim 1, further including a speed sensor in communication with the controller for detecting a speed of the ground engaging member, wherein the controller controls the actuator to change the gear configuration of the sub-transmission based on the shift request signal in response to the speed of the ground engaging member being less than or equal to a speed threshold.

7. The recreational vehicle of claim 1, further including a speed sensor in communication with the controller for detecting a rotational speed of the transmission, wherein in response to detecting the shift request signal requesting a shift to a target gear configuration, the controller is operative to control the power source to a target output speed whereby the rotational speed of the transmission matches a rotational speed of the sub-transmission upon the sub-transmission being shifted to the target gear configuration.

8. The recreational vehicle of claim 7, wherein the controller is further operative to initiate a disengagement of the sub-transmission from the transmission prior to shifting the sub-transmission to the target gear configuration and a re-engagement of the sub-transmission to the transmission during or following the shifting the sub-transmission to the target gear configuration.

9. The recreational vehicle of claim 1, further including an operator seat;

a seatbelt; and at least one of a seat sensor, a seatbelt sensor, and a vehicle inclination sensor in communication with the controller, the seat sensor being operative to provide a signal indicative of at least one of a loaded state and an unloaded state of the operator seat, the seatbelt sensor being operative to provide a signal indicative of an engagement of the seatbelt, and the vehicle inclination sensor being operative to provide a signal indicative of an inclination angle of the vehicle, the shift request signal requesting a shift to a target gear configuration, and the controller blocking shifting of the sub-transmission to the target gear configuration based on the shift request signal in response to detecting at least one of the inclination angle exceeding a threshold angle, the seatbelt being disengaged, and the operator seat being in the unloaded state.

10. The recreational vehicle of claim 1, further including a brake configured to inhibit a rotation of the ground engaging member;

a brake input device operative to control the brake; and a sensor in communication with the controller and operative to provide a signal indicative of an actuation of the brake input device, the controller controlling the actuator to change the gear configuration of the sub-transmission based on the shift request signal in response to detecting the shift request signal during an actuation of the brake input device, the controller blocking shifting of the sub-transmission based on the shift request signal in response to detecting the shift request signal while the brake input device is not actuated.

11. The recreational vehicle of claim 1, wherein the plurality of selectable gear configurations of the sub-transmission includes the forward gear, the neutral gear, the reverse gear, and the park gear, wherein in the park gear the sub-transmission blocks movement of the ground engaging member.

12. The recreational vehicle of claim 1, wherein the controller includes a vehicle control module, and the vehicle control module includes an internal H-bridge circuit operative to output control signals to drive the actuator in a forward rotational direction and in a reverse rotational direction for shifting through the plurality of the selectable gear configurations of the sub-transmission.

13. The recreational vehicle of claim 1, further including a steering input device operative to control a steering angle of the vehicle, wherein the shift device is coupled to the steering input device.

14. The recreational vehicle of claim 13, wherein the steering input device includes a handlebar having a left grip portion and a right grip portion, and the shift device includes a left shift device coupled to the handlebar proximate the left grip portion and a right shift device coupled to the handlebar proximate the right grip portion, each of the left and right shift devices including a sensor operative to provide a shift request signal to the controller.

15. The recreational vehicle of claim 1, wherein the sensor of the shift device is operative to provide the shift request signal based on an actuation of the shift device, and the controller controls the actuator to change the gear configuration of the sub-transmission to a first target gear configuration in response to detecting the actuation of the shift device for a first duration and to a second target gear configuration in response to detecting the actuation of the shift device for a second duration, the first duration being different than the second duration.

16. The recreational vehicle of claim 1, further including a handlebar configured to control a steering angle of the vehicle and a straddle-type seat configured to support an operator of the vehicle.

17. The recreational vehicle of claim 1, further including a roll cage and an external storage platform positioned rearwardly of the roll cage.

18. The recreational vehicle of claim 17, wherein the external storage platform is positioned above the power source and is moveable to provide access to the power source.

19. A method of controlling a sub-transmission of a recreational vehicle, the method including:
   controlling, by a controller of the vehicle, an output speed of a power source of the vehicle, the power source including at least one of an engine and an electric motor, the controller including at least one processor;
   controlling, by the controller, a gear ratio of a transmission of the vehicle, the transmission including at least one of a continuously variable transmission and a hydrostatic transmission, the transmission being driven by the power source;
   detecting, by the controller, a shift request signal provided by a shift device, the shift request signal indicating a request to shift a sub-transmission of the vehicle to a target gear configuration, the sub-transmission being driven by an output of the transmission and having a plurality of selectable gear configurations including a forward gear and at least one of a park gear, a reverse gear, and a neutral gear;
   detecting the output speed of the power source of the vehicle;
   controlling, by the controller, an actuator to change a gear configuration of the sub-transmission to the target gear configuration based on the shift request signal; and
   comparing the detected output speed to a speed threshold, wherein the actuator is controlled to change the gear configuration to the target gear configuration based on the shift request signal in response to the detected output speed of the power source being less than the speed threshold.

20. The method of claim 19, further including, in response to the detected output speed of the power source exceeding the speed threshold, controlling the power source to reduce the output speed of the power source prior to changing the gear configuration of the sub-transmission based on the shift request signal.

21. The method of claim 19, wherein the vehicle includes a starting clutch coupled to an output of the power source and configured to engage the transmission upon the output speed of the power source exceeding an engagement speed threshold, and the output speed threshold is less than or equal to the engagement speed threshold.

22. The method of claim 19, further including
   detecting a rotational speed of the transmission; and
   comparing the rotational speed of the transmission to a transmission speed threshold, wherein the actuator is controlled to change the gear configuration to the target gear configuration based on the shift request signal in response to the rotational speed of the transmission being less than or equal to the transmission speed threshold.

23. The method of claim 19, further including
   detecting a ground speed of the vehicle; and
   comparing the ground speed of the vehicle to a ground speed threshold, wherein the actuator is controlled to change the gear configuration to the target gear configuration based on the shift request signal in response to the ground speed of the vehicle being less than or equal to the ground speed threshold.

24. The method of claim 19, further including controlling the output speed of the power source to a target output speed to match a rotational speed of the transmission to a rotational speed of the sub-transmission upon the sub-transmission being shifted to the target gear configuration.

25. The method of claim 24, further including
   disengaging the sub-transmission from the transmission prior to shifting the sub-transmission to the target gear configuration; and
   re-engaging the sub-transmission to the transmission during or following the shifting the sub-transmission to the target gear configuration.

26. The method of claim 19, further including
   monitoring at least one of an engagement of a seatbelt of the vehicle, an inclination angle of the vehicle, and at least one of a loaded state and an unloaded state of an operator seat of the vehicle; and
   blocking shifting of the sub-transmission based on the shift request signal in response to detecting at least one of the inclination angle exceeding a threshold angle, the seatbelt being disengaged, and the operator seat being in the unloaded state.

27. The method of claim 19, further including
   monitoring an actuation of a brake input device based on a brake sensor output, the brake input device being operative to control a brake of the vehicle;
   controlling the actuator to change the gear configuration of the sub-transmission based on the shift request signal in response to detecting the shift request signal during an actuation of the brake input device; and
   blocking shifting of the sub-transmission based on the shift request signal in response to detecting the shift request signal while the brake input device is not actuated.

28. The method of claim 19, wherein the controlling the actuator includes
   controlling the actuator to change the gear configuration of the sub-transmission to a first target gear configuration in response to detecting the shift request signal for a first duration; and
   controlling the actuator to change the gear configuration of the sub-transmission to a second target gear configuration in response to detecting the shift request signal for a second duration, the first duration being different than the second duration.

29. The method of claim 19, further including blocking shifting of the sub-transmission based on the shift request signal in response to detecting a loss of an input signal at the controller.

30. A non-transitory computer-readable medium comprising:
   executable instructions such that when executed by at least one processor cause the at least one processor to:
      control an output speed of a power source of a vehicle, the power source including at least one of an engine and an electric motor;

control a gear ratio of a transmission of the vehicle, the transmission including at least one of a continuously variable transmission and a hydrostatic transmission, the transmission being driven by the power source;

detect a shift request signal provided by a shift device, the shift request signal indicating a request to shift a sub-transmission of the vehicle to a target gear configuration, the sub-transmission being driven by an output of the transmission and having a plurality of selectable gear configurations including a forward gear and at least one of a park gear, a reverse gear, and a neutral gear;

detect the output speed of the power source of the vehicle;

compare the detected output speed to a speed threshold, and control an actuator to change a gear configuration of the sub-transmission to the target gear configuration based on the shift request signal; wherein the actuator is controlled by the at least one processor to change the gear configuration to the target gear configuration based on the shift request signal in response to the detected output speed of the power source being less than the speed threshold.

31. The non-transitory computer-readable medium of claim 30, wherein the at least one processor, in response to the detected output speed of the power source exceeding the speed threshold, further controls the power source to reduce the output speed of the power source prior to changing the gear configuration of the sub-transmission based on the shift request signal.

32. The non-transitory computer-readable medium of claim 30, wherein the at least one processor detects a rotational speed of the transmission; and compares the rotational speed of the transmission to a transmission speed threshold, wherein the at least one processor controls actuator to change the gear configuration to the target gear configuration based on the shift request signal in response to the rotational speed of the transmission being less than or equal to the transmission speed threshold.

33. The non-transitory computer-readable medium of claim 30, wherein the at least one processor further controls the output speed of the power source to a target output speed to match a rotational speed of the transmission to a rotational speed of the sub-transmission upon the sub-transmission being shifted to the target gear configuration.

34. The non-transitory computer-readable medium of claim 30, wherein the at least one processor controls the actuator to change the gear configuration of the sub-transmission to a first target gear configuration in response to detecting the shift request signal for a first duration; and controls the actuator to change the gear configuration of the sub-transmission to a second target gear configuration in response to detecting the shift request signal for a second duration, the first duration being different than the second duration.

* * * * *